No. 824,748. PATENTED JULY 3, 1906.
E. F. SCHNEIDER.
EGG BREAKER AND SEPARATOR.
APPLICATION FILED AUG. 31, 1905.
2 SHEETS—SHEET 1.
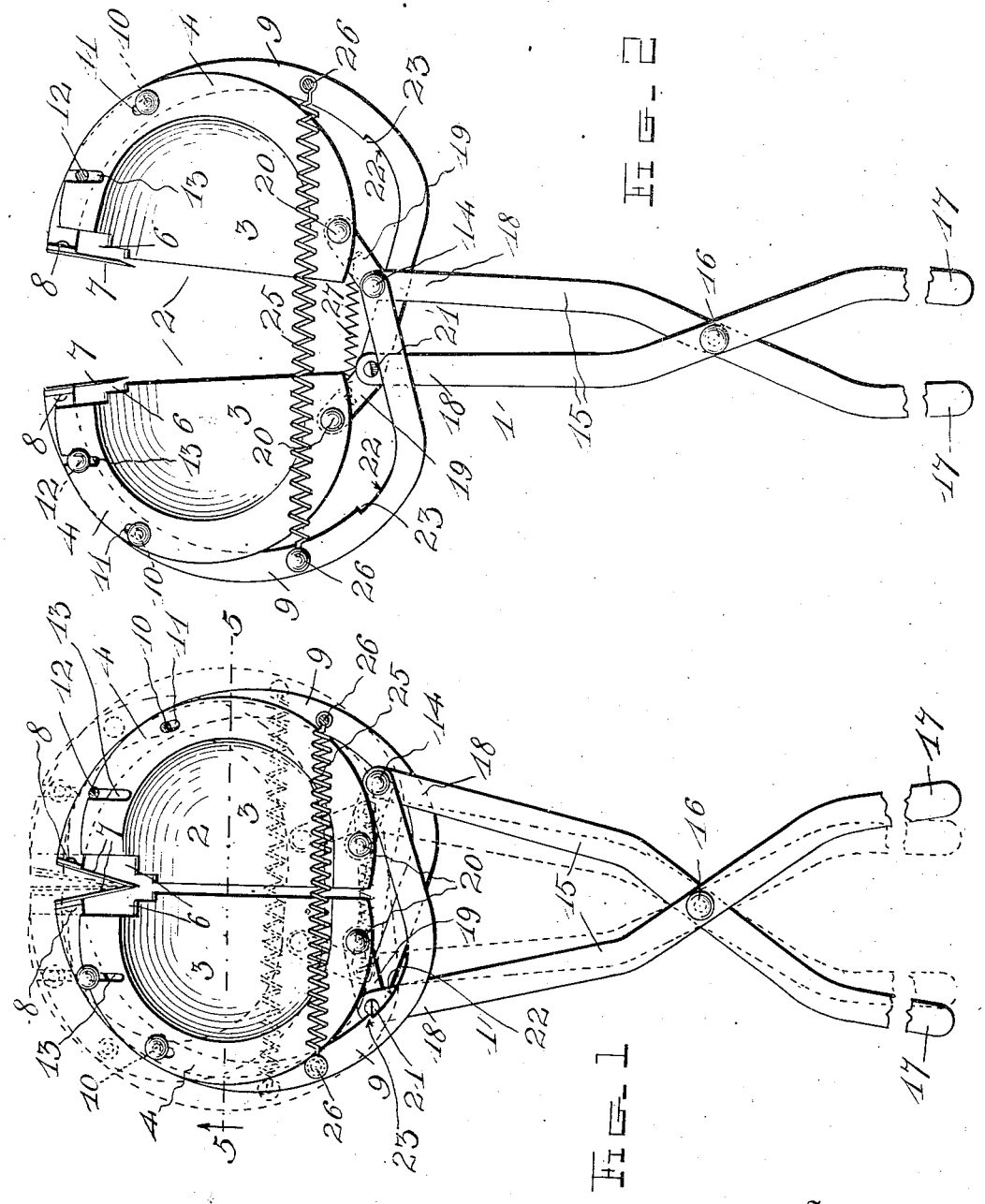

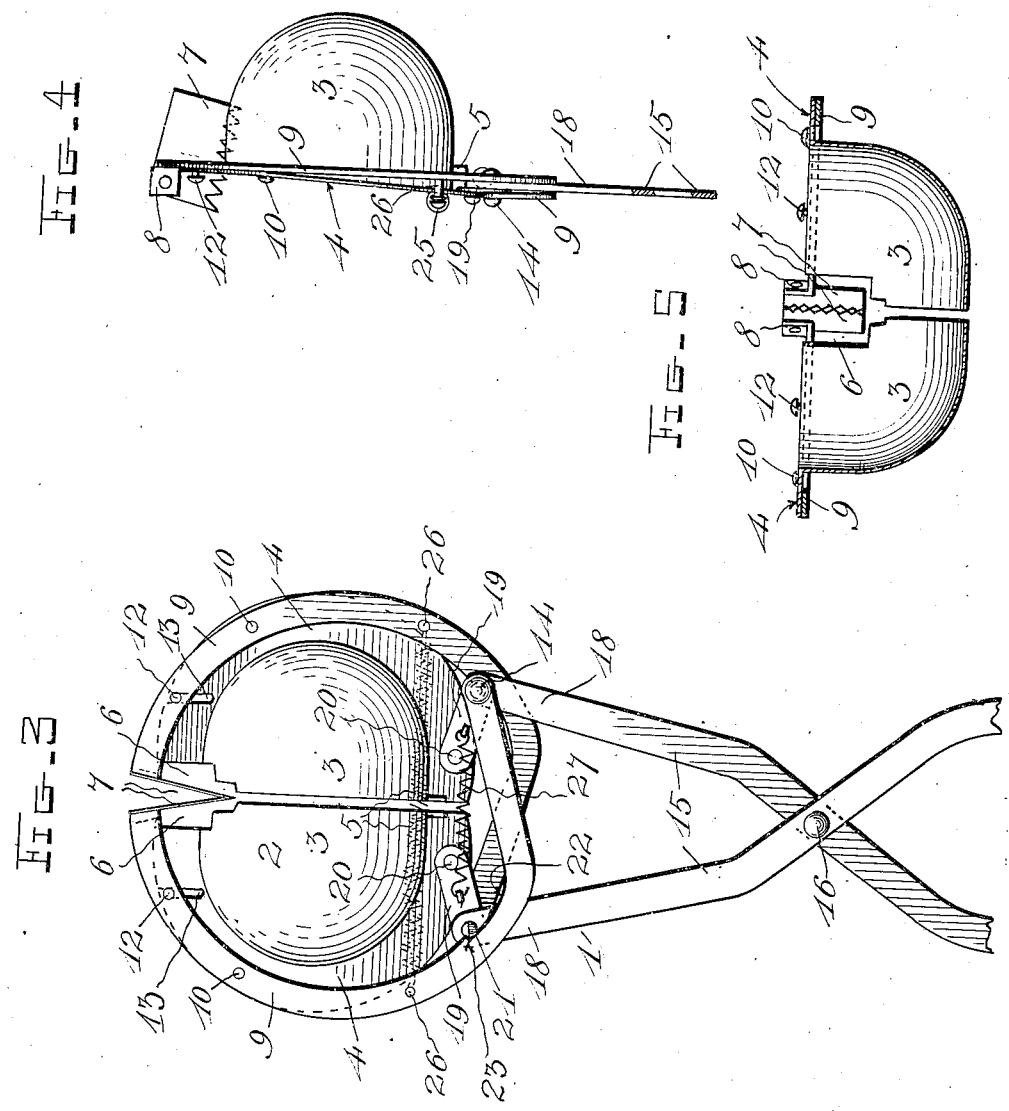

UNITED STATES PATENT OFFICE.

EDWARD F. SCHNEIDER, OF NORTH YAMHILL, OREGON.

EGG BREAKER AND SEPARATOR.

No. 824,748.

Specification of Letters Patent.

Patented July 3, 1906.

Application filed August 31, 1905. Serial No. 276,599.

*To all whom it may concern:*

Be it known that I, EDWARD F. SCHNEIDER, a citizen of the United States, residing at North Yamhill, in the county of Yamhill and State of Oregon, have invented certain new and useful Improvements in Egg Breakers and Separators; and I do declare the following to be a full, clear, and exact description of the invention, such as will enable others skilled in the art to which it appertains to make and use the same.

My invention relates to improvements in devices for breaking and separating eggs; and it consists in the novel construction, combination, and arrangement of parts hereinafter described and claimed.

The object of the invention is to provide a simple, convenient, and efficient device of this character by means of which either cooked or uncooked eggs may be quickly and easily broken, so that their contents may be removed without burning or soiling the hands.

A further object of the invention is to so construct the device that it may be used as a separator to separate the yolk from the white of the egg after the shell is broken.

The above and other objects, which will appear as the nature of my invention is better understood, are accomplished by means of the construction illustrated in the accompanying drawings, in which—

Figure 1 is a top plan view of my improved device, the same being shown in full lines in its closed position and in dotted lines in a partially-open position. Fig. 2 is a similar view showing the parts in their open position. Fig. 3 is a plan view showing the reverse side of the device from that shown in Fig. 1. Fig. 4 is a side elevation, and Fig. 5 is a transverse sectional view taken on the line 5 5 in Fig. 1.

Referring to the drawings by numeral, 1 denotes my improved egg breaking and separating device, which comprises a sectional cup or receptacle 2, consisting, preferably, of two half-sections 3, which together form a substantially semispherical or egg-shaped body. These half-sections 3 have at their upper edges outturned flanges 4, at their inner ends downturned stop-flanges 5, and at their outer ends recesses 6 to receive cutters or knives 7, which are adapted to break the egg in the cup or receptacle. These cutters 7 are, as shown, in the form of toothed knife-blades, which are riveted or otherwise secured upon the upwardly-bent forward ends 8 of curved levers 9. The latter, which are of substantially semicircular form, so that their rear ends overlap and cross each other, are loosely mounted upon the flanges 4 of the cup-sections 3, so that their forward ends 8 and the cutters 7 may have an inward sliding movement through the recesses 6 in said cup-sections. This mounting of the curved cutter-carrying levers 9 is effected by providing them at suitable points with pivot-studs 10, which project through elongated slots or openings 11, formed in the flanges 4, and by providing upon the forward ends of said levers adjacent to the cutters guide-studs 12, which are adapted to project through and slide in slots or openings 13, formed in said flanges 4, as clearly shown in Figs. 1 and 2 of the drawings. The rear ends of the cutter-carrying levers 9 are pivotally connected, as at 14, to the inner ends of a pair of crossed hand-levers 15, which are pivotally connected, as shown, at 16. The outer ends 17 of the levers 15 form handles by which the device is operated, and their inner ends 18 are connected to the inner ends of the cup-sections 3 by links 19, each of which has one of its ends engaged with one of the pivots 14 and its opposite end pivotally connected at 20 to the flange 4 of one of the cup-sections. Upon the inner ends 18 of the hand-levers 15 are provided studs 21, preferably formed by extending the ends of the pivots 14, which are adapted to coact with cams 22, formed upon the rear overlapping ends of the curved cutter-carrying levers 9. It will be seen upon reference to Figs. 1 and 2 of the drawings that the studs 21 project in opposite directions, so that one coacts with each of the levers 9, the latter being disposed upon opposite sides of the hand-levers 15, as will be seen upon reference to Fig. 4. This cam-and-stud connection is provided for the purpose of causing the hand-levers to swing the levers 9, so that they will cause the cup-sections 3 to be separated, as presently explained. Each of the cams 22 is formed at one of its ends with a stop-shoulder 23, with which one of the studs 21 is held normally engaged by the action of a spring 25. The latter is provided for the purpose of holding the cup-sections and cutters normally in their closed position, and it is preferably in the form of a coil-spring, which has its opposite ends connected, as at 26, to the levers 9. The links 19 are also preferably connected by a small coil-spring 27, which is weaker than the spring 25 and is provided for the purpose of drawing said links together and returning them to their normal position after they have been swung in opposite directions by the extreme opening of the cup-sections 2, as shown in Fig. 2 of the drawings.

The operation of the device is as follows: When an egg is placed in the cup or receptacle 2 and the handles 17 of the hand-levers 15 are moved together, the cutters 7 will first be moved into the cup between its sections 3, so as to break the shell of the egg, and they will then be simultaneously separated and moved farther inwardly as the half-sections 3 of the cup are moved apart to separate the broken sections of the egg. By reason of the mounting of the levers 9 and the provision of the cams 22 and their coacting studs 21 it will be seen upon reference to Figs. 1 and 2 of the drawings that the cutters will first be moved inwardly to break the egg and engage its shell, then moved apart to separate the sections of the same.

By means of the device fresh or uncooked eggs may be quickly and easily broken and opened sufficiently to permit their whites to be separated from the yolks without breaking the latter, as will be readily understood. Cooked eggs may be equally as well broken and separated, so that their contents may be removed while very hot and without burning or soiling the hands.

Having thus described my invention, what I claim as new, and desire to secure by Letters Patent, is—

1. An egg breaker and separator, comprising an egg-holding cup, divided into half-sections, links pivotally connected to said cup-sections, levers pivotally connected to the cup-sections and having longitudinal movement with reference thereto, and cutters carried by the levers, at their outer ends and disposed at the meeting sides of the cup-sections, said links connecting the inner ends of the levers, each to the opposite cup-section, substantially as described.

2. A device of the character described comprising a sectional cup, a pair of hand-levers, links connecting said levers and the sections of said cup, and cutter-carrying levers mounted upon said cup-sections and actuated by said hand-levers.

3. A device of the character described comprising a sectional cup, a pair of hand-levers, links connecting said levers and the sections of said cup, a pair of cutter-carrying levers loosely mounted upon said cup-sections and pivotally connected with said hand-levers, cutters upon the free ends of said cutter-carrying levers, and means for holding said cutters and said cup-sections normally in their closed position.

4. A device of the character described comprising a sectional cup, a pair of hand-levers, links connecting said levers and the sections of said cup, a pair of cutter-carrying levers loosely mounted upon said cup-sections and pivotally connected with said hand-levers, cutters upon the free ends of said cutter-carrying levers, means for causing the ends of the cutter-carrying levers and their cutters to slide between the sections of said cup, and a spring for holding said cutters and said cup-sections normally in their closed position.

5. A device of the character described comprising a sectional cup, a pair of hand-levers, links connecting said levers and the sections of said cup, a pair of curved cutter-carrying levers slidably mounted and loosely pivoted upon said cup-sections, each of said cutter-carrying levers having one of its ends pivotally connected to one end of one of said hand-levers, cutter-blades upon the free ends of said cutter-carrying levers, projections upon said hand-levers, cams upon said cutter-carrying levers to coact with said projections, and means for holding said cutters and said cup-sections normally in their closed position.

6. A device of the character described, comprising a cup or receptacle composed of two half-sections, a pair of pivotally-connected, crossed, hand-levers, links connecting the inner ends of said levers and said cup-sections, a spring connecting said links, a pair of curved levers loosely pivoted intermediate their ends to said cup-sections, the rear ends of said curved levers being pivotally connected to the inner ends of said hand-levers, cutters upon the outer ends of said curved levers, guide-studs upon the outer ends of said curved levers and adapted to slide in slots formed in said cup-sections, a spring for moving the rear ends of said curved levers toward each other, projections upon said hand-levers, and cams upon said curved levers to coact with said projections, substantially as described.

In testimony whereof I have hereunto set my hand in presence of two subscribing witnesses.

EDWARD F. SCHNEIDER.

Witnesses:
E. B. FLETT,
A. E. McKERN.